Nov. 24, 1964     J. S. MARTIN     3,158,204
ROW MARKER

Filed Sept. 16, 1963

INVENTOR
J. STUART MARTIN
BY
Rudolph L. Lowell

ATTORNEY

Nov. 24, 1964

J. S. MARTIN 3,158,204

ROW MARKER

Filed Sept. 16, 1963

INVENTOR
J. STUART MARTIN
BY
*Rudolph L. Lowell*

ATTORNEY

United States Patent Office 3,158,204
Patented Nov. 24, 1964

3,158,204
ROW MARKER
James Stuart Martin, Rte. 2, Shenandoah, Iowa
Filed Sept. 16, 1963, Ser. No. 308,979
3 Claims. (Cl. 172—126)

This invention relates to a row marker apparatus for agricultural implements, and more particularly to a marker control mechanism for the row markers of seeding implements, such as planters and grain drills.

It is the object of the invention to provide an improved row marker for a tractor-propelled implement.

Another object of the invention is to provide a tractor-mounted implement with a pair of row markers which may be selectively raised and lowered independently of each other or concurrently raised and lowered.

A further object of the invention is to provide a ground-working agricultural implement with a row marker which can be raised or lowered without raising or lowering the implement and which can be raised or lowered when the implement is in motion.

Still another object of the invention is to provide a row marker for tractor-mounted implements which is readily applied to existing implements and is not attached to the tractor.

An additional object of the invention is to provide a power operated row marker for an agricultural implement which is easy to operate, inexpensive to manufacture, and reliable in operation.

These and other objects and advantages of this invention will be readily apparent upon reference to the following description and the accompanying drawing, wherein.

Figure 1:
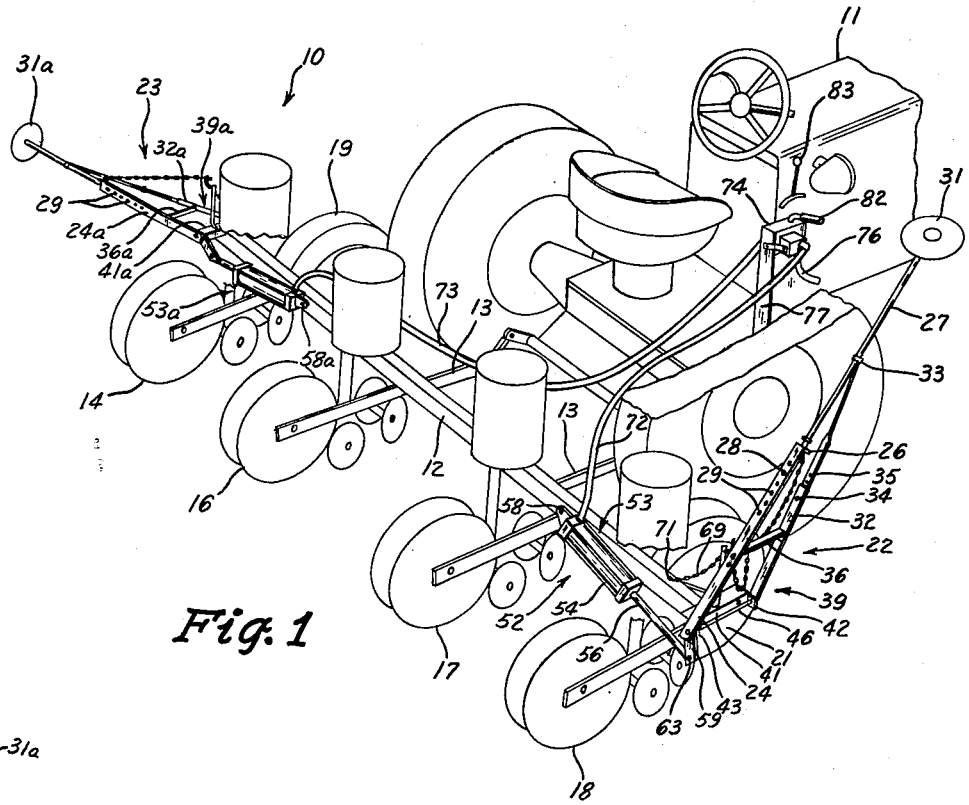
FIG. 1 is a perspective view of a tractor-mounted four-row lister planter equipped with the row marker apparatus of this invention.

Referring to the drawing, there is shown in FIG. 1 a four row lister planter 10 mounted on the rear of a farm tractor 11. The planter 10 has a transverse tool bar 12 which is connected to a hitch linkage 13 of the tractor. The tool bar 12 extends normal to the longitudinal axis of the tractor and projects laterally from each side of and adjacent the rear of the tractor. Mounted on the tool bar 12 are four identical earth working and planting units 14, 16, 17 and 18. The distance between adjacent units is substantially equal. A pair of ground-engaging wheels 19 and 21 are positioned forward of the opposite ends of the tool bar 12. These wheels are connected to the tool bar 12 and function to drive the planting portion of the adjacent units when they are in a planting position.

The tractor 11 has the conventional hydraulic lift system which is connected to the hitch linkage 13. The hydraulic system operates the hitch linkage 13 to raise and lower the tool bar 12 which in turn moves the earth working and planting units 14, 16, 17 and 18 between a raised position and a planting position.

The planter 10 is equipped with a right marker 22 and a left marker 23. These markers function to open a position indicating furrow as the planter moves over the seed bed. This furrow is utilized by the operator of the tractor as a guide to maintain a substantially uniform distance between adjacent outside rows.

The markers 22 and 23 are identical in construction. The following description is limited to the marker 22 with corresponding structure of the marker 23 indicated with the same reference numeral having the suffix a.

As shown in FIG. 1, the marker 22 comprises a transversely extended plate 24 having a forwardly extended flange 26 at its outer end. A tubular member 27 extends through a hole in the flange 26 and is secured to the side of the plate 24 by a bolt 28. The outer portion of the plate 24 has a plurality of longitudinally spaced holes 29 to accommodate the bolt 28. This structure provides for the longitudinal adjustment of the tubular member 27 relative to the plate 24. Rotatably mounted on the outer end of the tubular member 27 is a saucer-shaped disk 31 which functions as an earth working tool to turn a position indicating furrow when placed in a ground-engaging position.

In order to minimize the bending of the arm formed by the plate 24 and the tubular member 27, the arm is stabilized with a diagonal guy member 32. The outer end of the guy member 32 is connected to the tubular member 27 by a clamp 33, and the inner end thereof is connected to the planter. The guy member 32 is a two-piece assembly which is connected together by a bolt 34. One section of the guy member 32 has a plurality of longitudinally spaced holes 35 adapted to receive the bolt 34 for adjusting the length of the guy member 32.

Figure 3:
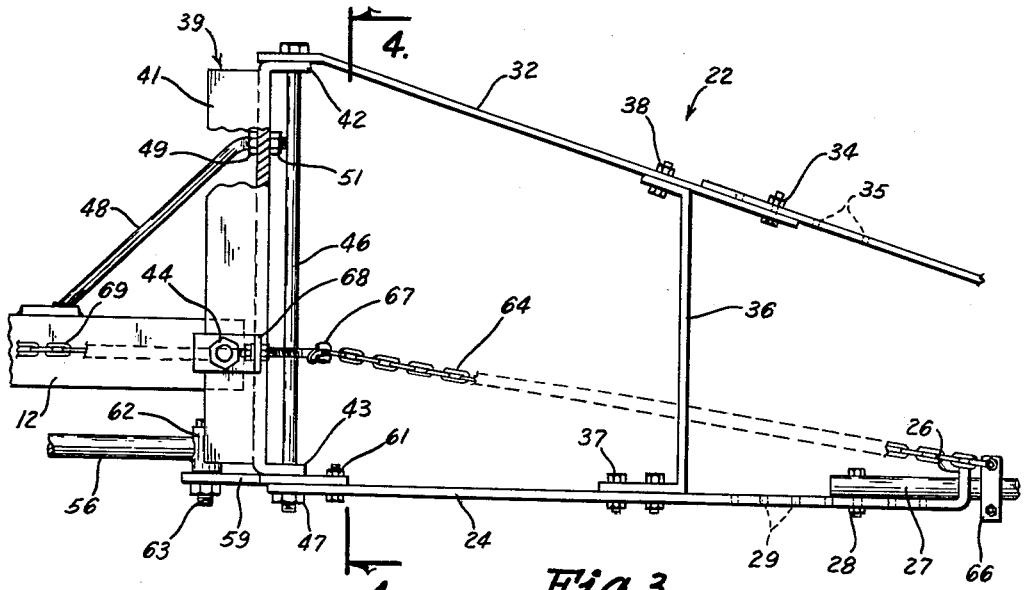
FIG. 3 is an enlarged plan view of the hinge connection between the planter tool bar and the row marker.

The plate 24 and the guy member 32 are held in a spaced relationship by a brace 36. As shown in FIG. 3, bolts 37 and 38 secure the opposite ends of the brace 36 to the plate 24 and the guy member 32, respectively.

Figures 4, 5:
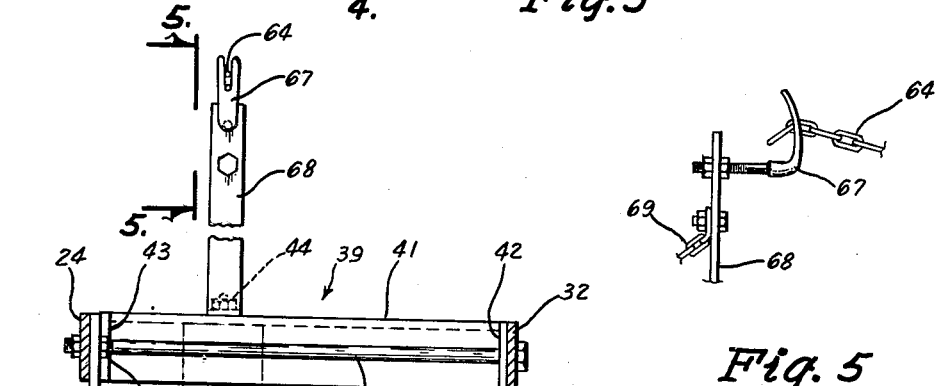
FIG. 4 is a sectional view taken along the line 4—4 of FIG. 3.
FIG. 5 is a fragmentary detailed view taken along the line 5—5 of FIG. 4.

The inner ends of the plate 24 and the guy member 32 are linked with the end of the tool bar 12 by a hinged connection 39. As shown in FIGS. 3 and 4, the hinged connection 39 comprises an angle member 41 having outwardly extended flanges 42 and 43 at the opposite ends thereof. The top section of the angle member 41 rests on the top of the tool bar 12, with a portion of the angle member positioned on each side of the tool bar. An upright bolt 44 projects through the end of the tool bar 12 and the top section of the angle member 41 and fastens the angle member 41 to the end of the tool bar 12.

The inner ends of the plate 24 and the guy member 32 are positioned adjacent the opposite sides of the flanges 42 and 43 and are pivotally connected thereto by a rod 46 extended transversely of the tool bar 12. A nut 47 threaded on one end of the rod 46 holds the rod in a working position.

The angle member 41 is positioned in a plane which is substantially normal to the longitudinal axis of the tool bar 12. This position of the angle member 41 is maintained by a brace 48. As shown in FIG. 3, the inner end of the brace 48 is secured to the tool bar 12 and extends in an outward and forward direction from the tool bar. The outer end of the brace 48 extends through a hole in the forward portion of the angle member 41. Nuts 49 and 51 are threaded on the brace 48 and engage opposite sides of the vertical flange of the angle member 41.

Figure 2:
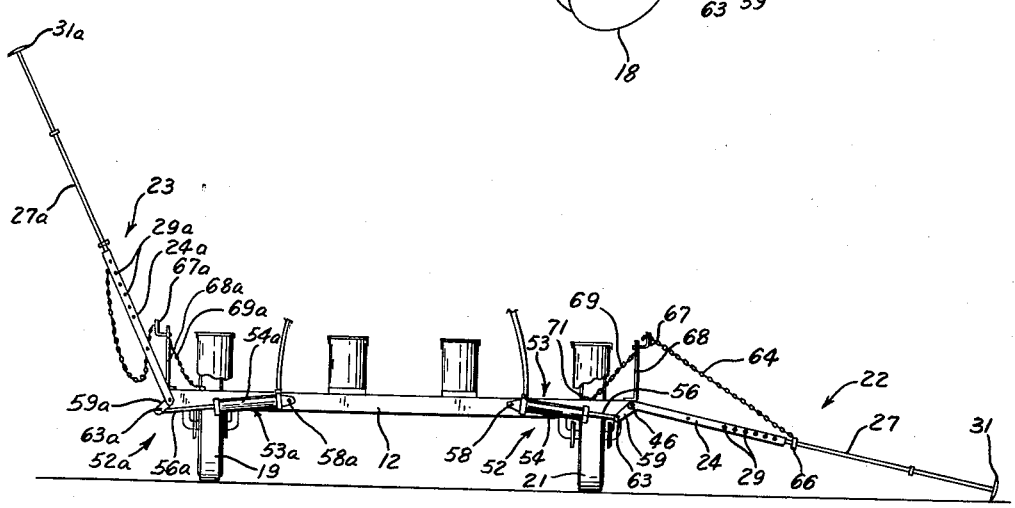
FIG. 2 is a diagrammatic rear elevation view of the planter of FIG. 1, showing the raised and lowered positions of the left and right row markers.

As shown in FIGS. 1 and 2, the marker 22 angularly moves about the axis of the rod 46 between a raised position, as shown in FIG. 1, and a working or lowered position as shown in FIG. 2. A lift mechanism 52 controls the angular movement of the marker 22. The lift mechanism comprises a fluid motor 53, which is illustrated as a hydraulic cylinder unit having a cylinder 54 and a piston rod 56. A bolt 58 pivotally mounts the head end of the cylinder 54 to the side of the tool bar 12. The cylinder unit extends in an outward and slightly downward direction positioning the end of the piston rod 56 below the inner end of the marker plate 24. A crank arm 59 connects the end of the piston rod 56 with the plate 24 of the marker 22. As shown in FIGS. 3 and 4, the crank arm 59 is positioned between the flange 42 and the plate 24 with the rod 46 extending through the top section thereof. A bolt 61 fastens the crank arm 59 to the plate 24.

The outer end of the piston rod 56 has a transverse head 62 which is positioned adjacent the lower end of the crank arm 59. A bolt 63 fastens the head 62 to the crank arm 59. As shown in FIGS. 1 and 2, crank arm 59 extends in a downward direction and forms an obtuse angle with the plate 24. This angular relationship of the crank arm 59 with respect to the plate 24 maintains the below-center relationship of the pivot bolt 63 and the rod 46 so that when the piston rod is moved in an outward direction the marker will rotate to its raised position and when the piston rod is moved in an inward direction the marker will fall to its working position.

The limit of the downward movement of the marker is determined by a length of chain 64 which is connected at its outer end to a bracket 66 clamped around the tubular member 27. The opposite end of the chain 64 attaches to a finger unit 67 carried by an upright frame 68. The bolt 44 fastens the frame 68 to the top of the tool bar 12. The upright position of the frame 68 is maintained by a short length of chain 69 which is connected to the upper section of the frame 68 and extends downwardly toward the tool bar 12 and is connected thereto by a bolt 71. As shown in FIGS. 4 and 5, the finger unit 67 has an upwardly extended bifurcated portion for receiving the links of the chain 64. The effective length of the chain 64 is adjusted by changing the linked position of the chain 64 relative to the finger unit 67.

As shown in FIG. 1, the fluid motors 53 and 53a are connected to the tractor source of fluid pressure by separate hose members 72 and 73 which are also connected to a three-way valve 74. A relatively small diameter hose member 76 connects the three-way valve 74 to the tractor source of pressure. The valve 74 is secured to an upright post 77 which positions the valve actuator handle 82 adjacent the tractor seat making it readily accessible to the tractor operator.

Figure 6:
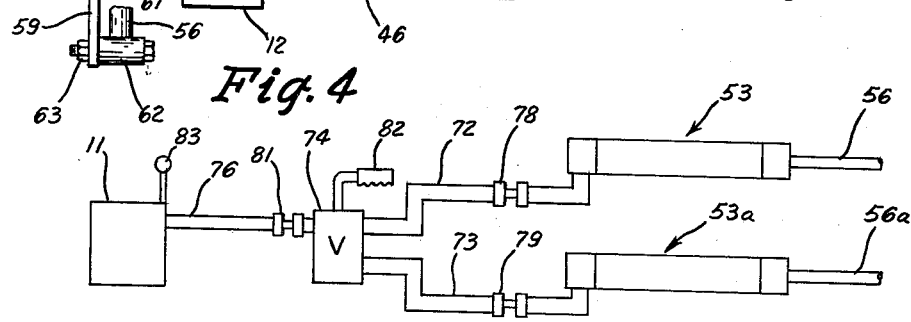
FIG. 6 is a schematic view of the hydraulic system of the marker lift mechanism.

As shown in the hydraulic circuit diagram of FIG. 6, the hose members 72 and 73 are relatively large in diameter and are connected to the head end of the fluid motors 53 and 53a and to the valve 74. Interposed in the hose members 72 and 73 are hydraulic flow retarders 78 and 79 which function to restrict the flow rate of hydraulic fluid to the fluid motors 53 and 53a, respectively. The flow rate of hydraulic fluid from the tractor to the valve 74 is restricted by a retarder 81 positioned in the hose member 76. The valve member 74 is a commercial unit. The valve 74 has an actuator handle 82 which is movable to three operating positions.

The operator of the tractor 11 controls the position of the markers 22 and 23 by moving the actuator handle 82 to a position wherein either the left or right fluid motor 53 and 53a, or both fluid motors, are provided with a supply of fluid pressure. The tractor 11 has a conventional control member 83 which is movable to on, hold, and off positions regulating the flow of fluid pressure to the valve 74. With the control member 83 in the on-position, fluid flows from the tractor to the valve 74 which functions to direct the fluid to the selected fluid motor, in accordance with the position of the valve actuator handle 82.

As shown in FIG. 1, the fluid motor 53 is charged with a supply of fluid under pressure which forces the piston rod 56 in an outward direction. This movement rotates the marker about the axis of the rod 46 moving the marker disk 31 to a raised position. The hydraulic flow retarders 78 and 81 restricts the operation of the fluid motor 53 causing the marker to raise at a slow and safe rate of speed. When the control member 83 is moved to its hold position, the hydraulic fluid in the fluid motor 53 is trapped and functions to retain the marker in a raised position. When the operator of the vehicle moves the control member 83 to the off-position, hydraulic fluid in the fluid motor 53 and the hose members 72 and 76 flows back to the tractor reservoir in response to the weight of the marker 22 which moves in a downward direction to its lowered or working position. The operator of the tractor merely changes the position of the valve actuator handle 82 to selectively raise and lower the right and left hand markers independent of each other or he may concurrently raise and lower both markers.

The planter 10 can be in a raised or lowered position when the markers are operated. The position of the planter does not affect the operation of the markers 22 and 23. The marker which is in the working position may be raised to clear an obstruction without stopping the forward motion of the tractor.

While there have been shown, described, and pointed out the fundamental novel features of the invention, it is to be understood that various omissions, substitutions, changes in form, and details of the apparatus illustrated may be made by those skilled in the art, without departing from the spirit of the invention. It is intended to be limited only as indicated by the scope of the following claims.

I claim:

1. An implement mountable on a tractor having a source of fluid pressure comprising:

(a) a tool bar mounted on the tractor and extended transversely thereof, (b) ground working tool means mounted on the tool bar, (c) first marker means including an outer end section having an earth-working tool mounted thereon and an inner end section comprising spaced-apart mounting members having a pair of substantially aligned apertures therein, and crank arm means secured to one of said mounting members and having a fulcrum aperture therein in substantial alignment with said aligned apertures and having a member depending therefrom, (d) mounting means for said first marker means including an angle-bar member mounted on one end of said tool bar at substantially right angles thereto, a brace member connected to said angle-bar member and said tool bar at acute angles with respect to each for maintaining the perpendicular relationship therebetween, end flanges on said angle-bar member at right angles thereto spaced apart a distance substantially equal to the spacing between said mounting members, said end flanges having a pair of substantially aligned apertures, and a bolt extending through all of said aligned apertures for mounting said marker means on said angle-bar member for pivotal movement with respect thereto about the axis defined by said aligned apertures, (e) first fluid motor means connected to said tool bar and said depending member of said crank arm means, said first fluid motor means operable in response to fluid pressure from said source to move the outer end section of the first marker means from a working position to a raised position, (f) second marker means including an outer end section having an earth-working tool mounted thereon and an inner end section comprising spaced-apart mounting members having a pair of substantially aligned apertures therein, and crank arm means secured to one of said mounting members and having a fulcrum aperture therein in substantial alignment with said aligned apertures and having a member depending therefrom, (g) mounting means for said second marker means including an angle-bar member mounted on the other end of said tool bar at substantially right angles thereto, a brace member connected to said angle-bar member and said tool bar at acute angles with respect to each for maintaining the perpendicular relationship therebetween, end flanges on said angle-bar member at right angles thereto spaced apart a distance substantially equal to the spacing between said mounting members, said end flanges having a pair of substantially aligned apertures, and a bolt extending through all of said aligned apertures for mounting said marker means on said angle-bar member for pivotal movement with respect thereto about the axis defined by said aligned apertures, (h) second fluid motor means connected to said tool bar and said depending member of said crank arm means of said second marker means, said second fluid motor means operable in response to fluid pressure from said source to move the outer end section of the second marker means from a working position to a raised position, and (i) operator-actuated control means operable to separately connect and disconnect the first and second fluid motor means with the tractor source of fluid pressure and to concurrently connect and disconnect the first and second fluid motor means with the tractor source of fluid pressure.

2. The implement defined in claim 1, wherein the operator-actuated control means includes (a) a three-way valve means operable to separately direct the flow of hydraulic fluid to the first and second fluid motor means and to concurrently direct the flow of hydraulic fluid to the first and second fluid motor means.

3. In an implement having a tool bar extended transversely of and mountable on a tractor having a source of fluid pressure;

(a) marker means including an outer end section having an earth-working tool mounted thereon and an inner end section comprising spaced-apart mounting members having a pair of substantially aligned apertures therein, and crank arm means secured to one of said mounting members and having a fulcrum aperture therein in substantial alignment with said aligned apertures and having a member depending therefrom, (b) mounting means for said marker means including an angle-bar member mounted on one end of such tool bar at substantially right angles thereto, a brace member connected to said angle-bar member and such tool bar at acute angles with respect to each for maintaining a perpendicular relationship therebetween, end flanges on said angle-bar member at right angles thereto spaced apart a distance substantially equal to the spacing between said mounting members, said end flanges having a pair of substantially aligned apertures, and a bolt extending through all of said aligned apertures for mounting said marker means on said angle-bar member for pivotal movement with respect thereto about the axis defined by said aligned apertures, (c) fluid motor means connected to said tool bar and said depending member of said crank arm means, said fluid motor means operable in response to fluid pressure from said source to raise the outer end section of the marker means, and (d) operator-actuated control means operable to connect and disconnect the fluid motor means and the tractor source of fluid pressure.

References Cited by the Examiner

UNITED STATES PATENTS

| 669,005 | 2/01 | Anderson | 172—126 |
|---|---|---|---|
| 960,444 | 6/10 | Tucker | 172—132 |
| 2,175,282 | 10/39 | Cormany | 172—126 |
| 2,618,214 | 11/52 | Ball | 172—128 |
| 2,651,248 | 9/53 | Ballu. | |
| 2,800,847 | 7/57 | Bennett | 172—491 |
| 2,840,974 | 7/58 | Dunn et al. | 56—25 |
| 2,975,841 | 3/61 | Oehler et al. | 172—128 |
| 3,107,734 | 10/63 | Richman | 172—128 |

ABRAHAM G. STONE, *Primary Examiner.*